United States Patent [19]

Lykken et al.

[11] 3,743,221

[45] July 3, 1973

[54] AIRCRAFT FLIGHT CONTROL APPARATUS

[75] Inventors: Lowell O. Lykken, Westlake Village; Naren M. Shah, Santa Monica, both of Calif.

[73] Assignee: Lear Siegler, Inc., Santa Monica, Calif.

[22] Filed: Apr. 9, 1970

[21] Appl. No.: 26,890

Related U.S. Application Data

[63] Continuation-in-part of Ser. No. 835,528, June 23, 1969, abandoned.

[52] U.S. Cl........ 244/77 A, 235/150.22, 244/77 D, 244/77 V, 343/5 LS, 343/108 R
[51] Int. Cl. ...................... B64c 13/18, B64c 13/44
[58] Field of Search.............. 244/77 A, 77 D, 77 V; 343/5 LS, 108 R, 108 M; 235/150.22; 35/10.2

[56] References Cited
UNITED STATES PATENTS

| | | | |
|---|---|---|---|
| 3,604,908 | 9/1971 | Loome et al.................. | 244/77 A X |
| 3,652,835 | 3/1972 | Devlin et al. ................. | 244/77 A X |
| 3,658,280 | 4/1972 | McDonnell ...................... | 244/77 D |
| 3,291,421 | 12/1966 | Kramer et al..................... | 244/77 A |
| 3,327,973 | 6/1967 | Kramer et al..................... | 244/77 A |
| 3,077,110 | 2/1963 | Gold ............................. | 235/150.22 X |
| 3,333,795 | 8/1967 | Hattendorf et al. .............. | 244/77 A |
| 3,589,648 | 6/1971 | Gorham et al. ................... | 244/77 A |
| 2,943,823 | 7/1960 | Mullins et al...................... | 244/77 D |
| 2,627,384 | 2/1953 | Esval................................ | 244/77 D |
| 3,510,092 | 5/1970 | Hendrick et al.................. | 244/77 D |

*Primary Examiner*—Milton Buchler
*Assistant Examiner*—Stephen G. Kunin
*Attorney*—Jackson & Jones, Harold L. Jackson, Stanley R. Jones, Robert M. Vargo and Eric T. S. Chung

[57] ABSTRACT

Apparatus for generating a command signal to control an aircraft in the vertical direction. A signal representative of the desired rate of descent of the aircraft is combined with a signal representative of the actual rate of descent. The latter signal is derived from a source that accurately represents the rate of descent at high altitude, e.g., the integrated output of a normal accelerometer or the differentiated output of a barometric altimeter, and a source that accurately represents the rate of descent at low altitude, e.g., the differentiated output of a radio altimeter. At high altitude, the first source is used; at low altitude, the second source is used; and at intermediate altitude, a decreasing percentage of the signal from the first source is blended with an increasing percentage of the signal from the second source. In one embodiment, the signals from the two sources are complementarily blended by means of a single gain changing circuit. The difference between the two signals is applied to the input of the gain changing circuit and the output signal of the gain changing circuit is added to one of the signals. In another embodiment, the integrator that operates on the glide slope error is used to derive from a normal accelerometer the signal representative of the actual rate of descent at high altitude and the gain changing circuit that controls the flare profile is used to blend the signals from the two sources. In forming the command signal to control the aircraft elevator, a vertical acceleration term is employed instead of a pitch attitude term. With appropriate shaping, this command signal is suitable for controlling aircraft spoilers as well.

23 Claims, 7 Drawing Figures

Patented July 3, 1973

INVENTORS.
NAREN M. SHAH
LOWELL O. LYKKEN

BY Christie, Parker & Hale
ATTORNEYS

AIRCRAFT FLIGHT CONTROL APPARATUS

CROSS REFERENCE TO RELATED APPLICATIONS

This is a continuation-in-part of a copending commonly owned application, Ser. No. 835,528, filed June 23, 1969 now abandoned.

BACKGROUND OF THE INVENTION

This invention relates to aircraft flight control during a landing maneuver and, more particularly, to apparatus for producing a representation of the actual rate of descent of the aircraft that is accurate over the entire range of altitude encountered during the landing maneuver.

It is common during a landing maneuver for modern aircraft flight control systems to generate a command signal that is indicative of the aircraft elevator movements required to maintain the aircraft on a predetermined flight path or at a predetermined flight path angle. The command signal drives either a servo actuator that automatically positions the aircraft elevator or an instrument that informs the pilot how to position the aircraft elevator manually. Conventionally, the command signal is derived by combining a signal representative of the desired rate of descent of the aircraft with a signal representative of the actual rate of descent.

The signal representative of the desired aircraft rate of descent is usually generated with the aid of ILS glide slope transmitting equipment provided at the airport where the landing maneuver is to be executed. A glide slope receiver on board the aircraft produces a glide slope error signal representative of the instantaneous vertical displacement of the aircraft from the center of the glide slope beam transmitted from the ground. The glide slope error signal is applied to an integrator whose output represents the desired aircraft rate of descent. As the aircraft approaches the glide slope transmitter, the amplitude of the glide slope error signal produced on the aircraft for a given vertical displacement from beam center increases. In this sense, the glide slope error signal can be considered less reliable near the ground.

K. C. Kramer et al., U.S. Pat. No. 3,291,421, issued Dec. 13, 1966, teaches that it is particularly advantageous to reduce gradually the percentage of the glide slope error signal actually applied to the integrator after the aircraft descends below a predetermined altitude. The influence of the glide slope error signal on the derivation of the desired aircraft rate of descent is thus diminished as the reliability of the glide slope information drops. After the percentage of the glide slope error signal is reduced to zero, the output of the integrator remains constant at a, so to speak, "memorized" value of rate of descent and the flare out to touchdown is initiated.

The actual aircraft rate of descent is usually derived by differentiating the output of an altimeter. A barometric altimeter can be used to yield an accurate indication of the actual rate of descent at high altitude; but it gives an unreliable reading at low altitude due to atmospheric disturbances, such as wind gusts, and due to the ground effect phenomenon. On the other hand, a radio altimeter yields an unreliable indication of the actual rate of descent at high altitude due to variations that occur in the terrain; but it gives an accurate reading at low altitude because the ends of the flight corridors approaching major commercial airports invariably lie over flat terrain. It is not feasible to eliminate the effects of terrain variations by filtering because the radio altimeter then responds too slowly for safe operation at low altitude.

A number of the modern flight control systems employed in commercial aircraft are being designed with a fail-operation capability for the landing mode and a fail-safe capability for most of the other modes of operation. A fail-safe system requires only dual redundancy, i.e., two identical channels, because operation is simply terminated when the two channels deviate from each other. A fail-operational system, however, requires at least triple redundancy, i.e., at least three identical channels, because operation continues on one or more channels after failure in another channel is detected. The third channel is required to identify which channel has failed. Thus, the situation arises that three barometric altimeters are necessary to achieve fail-operational performance in a landing mode but only two barometric altimeters are normally found on board an aircraft as sensors in the other flight modes. In such case, a third barometric altimeter must be especially furnished to produce a signal representative of the actual rate of descent for the landing mode.

In a fail operational flight control system having three or more redundant channels, signal voters are generally provided to select one of the plural command signals to actuate the aircraft control surfaces and an arrangement of comparators is customarily employed in conjunction with the signal voters to monitor the different command signals. Consequently, a substantial amount of electronic equipment is required to selectively couple the command signals to the servo actuators for the control surfaces. In some of the modern commercial aircraft, the conventional elevator pitch control is augmented during landing by direct lift control exercised through the aircraft spoilers. Direct lift control improves the response time of the aircraft in the vertical direction. Normally, separate command signals are produced to actuate the spoiler and to actuate the elevator because different damping terms are appropriate for the spoiler control loop and the elevator control loop. Thus, twice as much electronic equipment is needed to selectively couple the command signals to the servo actuators when direct lift control is utilized.

SUMMARY OF THE INVENTION

The invention contemplates the derivation of a signal representative of the actual rate of altitude change of an aircraft by combining the output of a first sensor that is accurate at high altitude, e.g., a barometric altimeter coupled to a rate circuit, with the output of a second sensor that is accurate at low altitude, e.g., a radio altimeter coupled to a rate circuit. Although the invention is particularly well-suited for a landing maneuver to generate an actual rate of descent representative signal that is accurate at all altitudes, it is not limited to this use. The combined percentage of the output of the first sensor is reduced as the aircraft descends and the combined percentage of the output from the second sensor is increased as the aircraft descends. Preferably, the combined percentage of the output from the first source decreases from 100 percent at a first predetermined altitude to zero percent at a second predetermined altitude, and the combined percentage of the output of the second sensor increases from zero percent at the first predetermined altitude to 100 percent at the second predetermined altitude. Thus, above the first predetermined altitude, the signal representing the actual rate of descent of the aircraft is determined exclusively by the output of the first sensor; between the first and second predetermined altitudes, the signal representative of the actual rate of descent of the aircraft is determined by a continuously changing inverse, complementary blend of the outputs from the first and second sensors; and below the second predetermined altitude, the signal representative of the actual rate of descent of the aircraft is determined by the output of the second sensor. Accordingly, an accurate representation of the actual rate of descent of the aircraft is provided over the full range of altitudes encountered in the landing maneuver.

One feature of the invention is the use of a single gain changing circuit to vary inversely in complementary fashion the percentage of the outputs of two sensors that are blended together. The outputs of the sensors are first combined in one sense, i.e., additively or differentially. The combined output of the sensors is applied to the gain changing circuit. The output of the gain changing circuit is directly combined in the opposite sense with the output of one of the sensors to produce the blended output.

Another feature of the invention is the use of a vertical or normal accelerometer and the preexisting integrator for the glide slope error signal as the first sensor. At high altitude, the output of the integrator provides an accurate representation of the difference between the desired and actual aircraft rate of descent because the glide slope error signal corrects any steady state offset, i.e., provides the proper constant of integration. The percentage of the output of the accelerometer applied to the integrator is reduced as the aircraft descends so the influence of the accelerometer on the actual rate of descent indication lessens at low altitude.

A third feature of the invention is the blending of the outputs of the two sensors in accordance with a gain schedule that coincides with the gain schedule of the gain changing circuit that controls the flare profile of the aircraft. Thus, the gain changing circuit that controls the flare profile can also be used to vary inversely and in complementary fashion the percentage of the outputs of two sensors that are blended together. This feature is particularly well suited for use with a first sensor comprising a vertical or normal accelerometer and an integrator, because the influence of the accelerometer on the actual rate of descent indication is not lessened until it becomes unreliable, i.e., until the glide slope error signal is reduced to zero. Conventionally, the glide slope error signal is reduced to zero at the same altitude at which the gain control circuit begins to generate the flare profile.

By generating a special elevator command signal, a spoiler command signal can be derived from the movement of the elevator actuator responsive to the elevator command signal. This obviates the need for a separate complement of electronic equipment, i.e., a quad-voter and an arrangement of comparators, to selectively couple spoiler command signals to the spoiler actuator. Only the special command signals from the different channels need to be selectively coupled to the actuators. The special command signal is generated from a term representing the difference between the actual and desired rate of descent, a term representing the vertical acceleration, and a term representing the pitch rate. A transducer coupled to the elevator actuator produces a signal representative of its movement. This signal is shaped and applied to the spoiler actuator as the spoiler command signal. The special command signal contains effective damping information for both the pitch control loop and the direct lift control loop. The pitch attitude damping term normally employed for the pitch control loop is simulated by the vertical acceleration term of the special command signal. Moreover, this vertical acceleration term provides an effective reaction in the direct lift control loop to wind gust and other atmospheric disturbances, as well as being responsive to the activity of the spoilers.

BRIEF DESCRIPTION OF THE DRAWINGS

The features of specific embodiments of the best mode contemplated of carrying out the invention are illustrated in the drawings, in which.

DETAILED DESCRIPTION OF THE SPECIFIC EMBODIMENTS

In FIGS. 1, 2, 4A, 5 and 6, different embodiments are shown of an automatic flight control system for positioning an aircraft control surface that controls the aircraft in a vertical direction during a landing maneuver. This automatic flight control system is intended to be used in connection with an instrument landing system (ILS) glide slope beam transmitted from the airport at which the aircraft is to land. The components shown in FIGS. 1, 2, 4A, 5 and 6 are all presumed to be on board the aircraft. Instead of, or in addition to, controlling an aircraft control surface, the disclosed embodiments could operate instruments that enable the pilot to operate the aircraft manually. Many of the components in the embodiments of FIGS. 1, 2, 4A, 5 and 6 are identical in construction and in function. Such components are identified by the same reference numerals in FIGS. 1, 2, 4A, 5 and 6.

Figure 1:
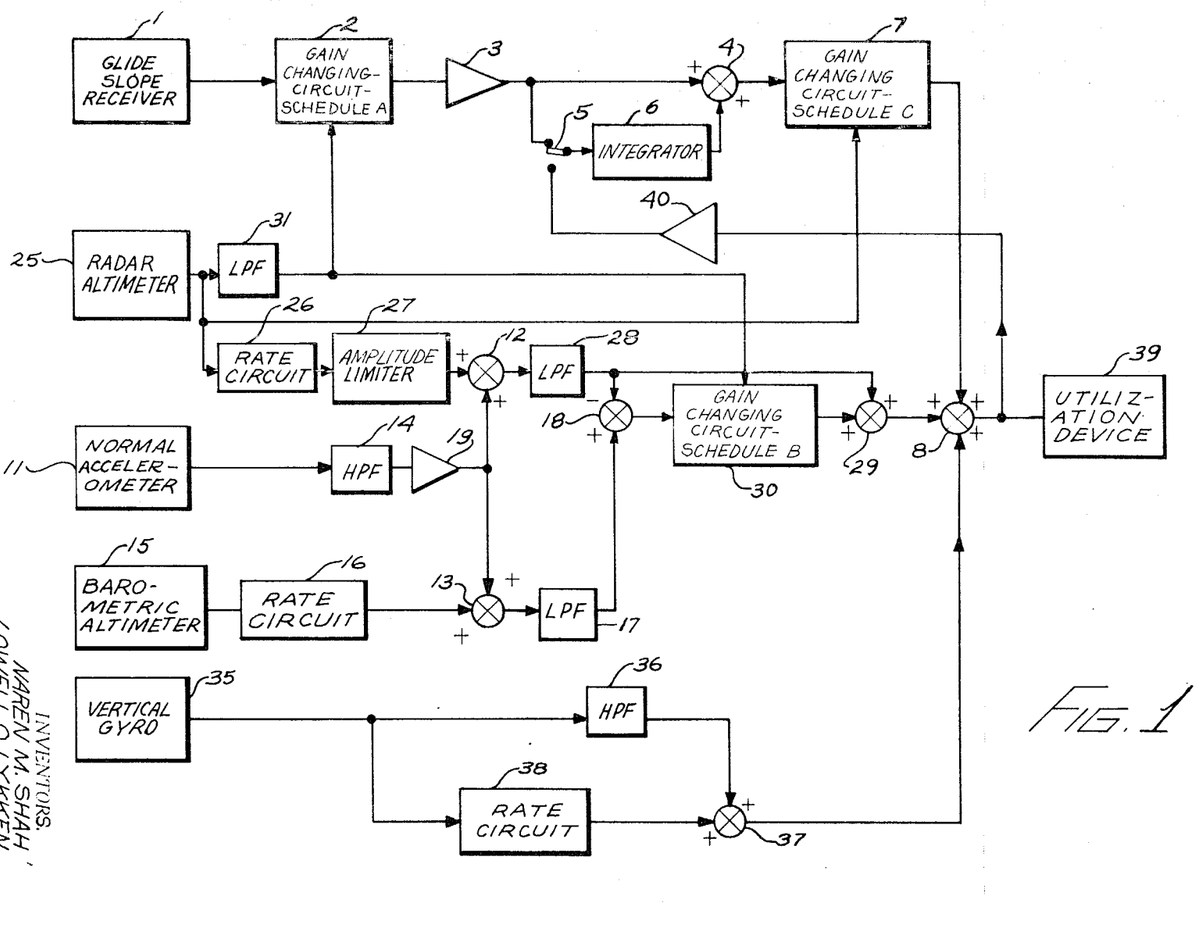
FIG. 1 is a block schematic diagram of one arrangement for generating a command signal to control an aircraft in the vertical direction during descent.
Figure 2:
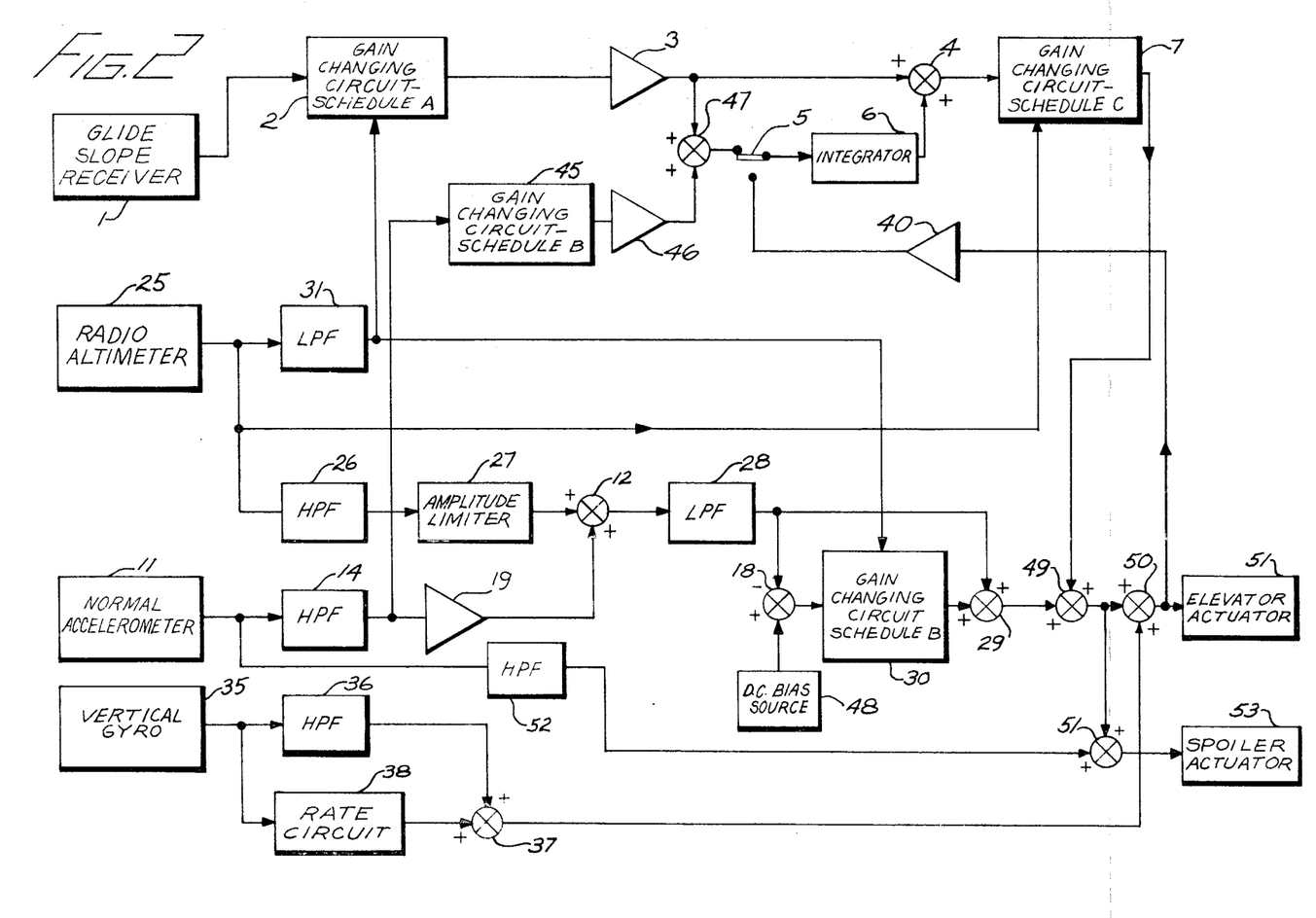
FIG. 2 is a block schematic diagram of another arrangement for generating a command signal.
Figure 3:
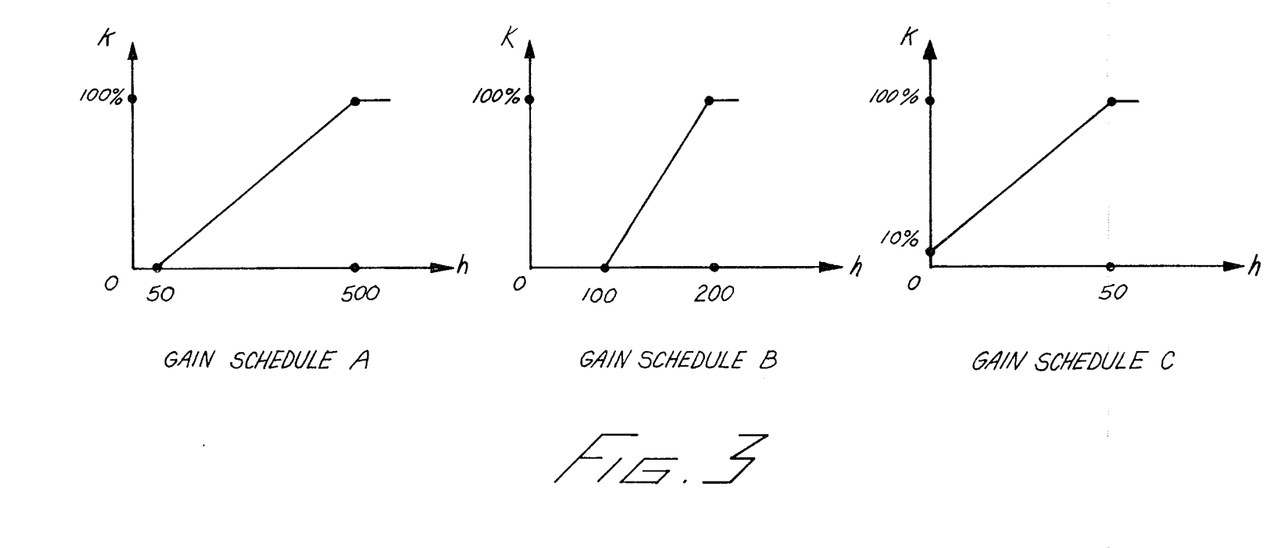
FIG. 3 is a graph depicting the gain schedules of the gain changing circuits in FIGS. 1 and 2 as a function of aircraft altitude.
Figure 4A:
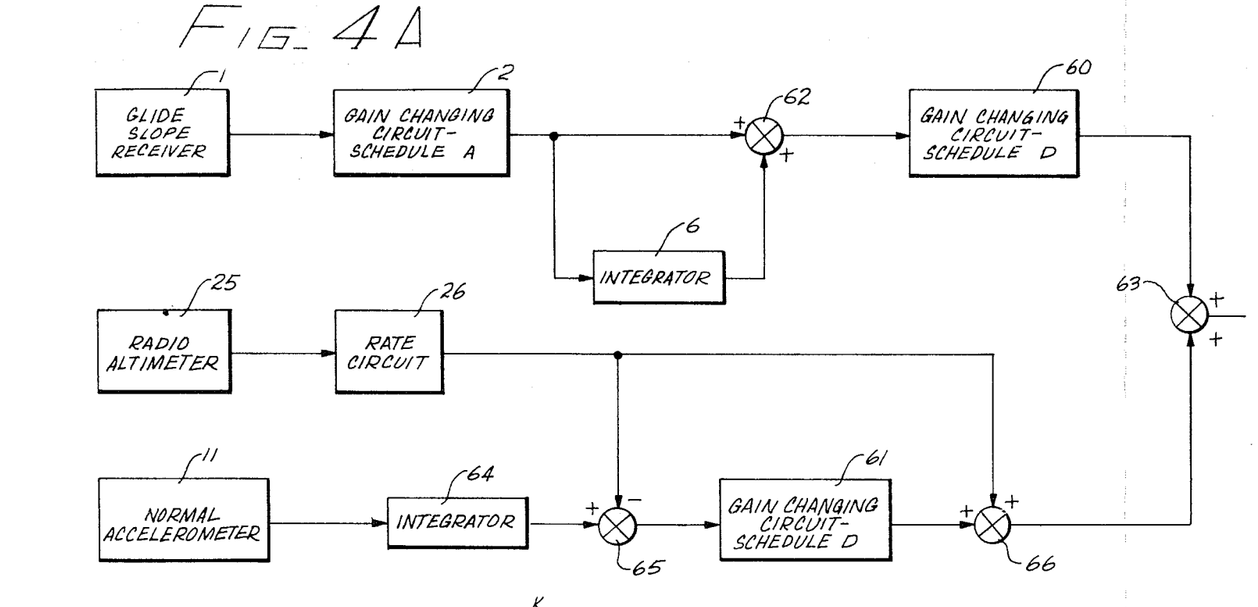
FIGS. 4A and 4B are respectively a partial block schematic diagram of another arrangement for generating a command signal and a graph depicting the gain schedule of one of its gain changing circuits as a function of aircraft altitude.
Figure 4B:
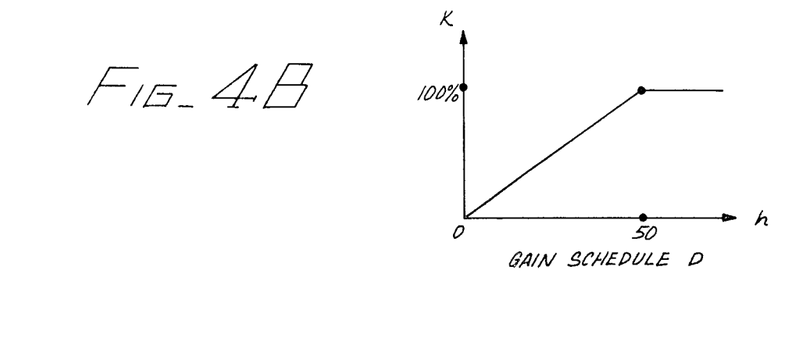

FIG. 3 illustrates the gain schedules of the gain changing circuits in FIGS. 1 and 2 as a function of aircraft altitude; FIG. 4B illustrates the gain schedules of the gain changing circuits in FIGS. 4A and 5 as a function of aircraft altitude. Although the disclosed gain schedules vary between zero and 100 percent, they could exceed 100 percent as well, in which case amplification takes place. In the disclosed embodiments of the invention, the gain or the percentage of the input signal transferred to the output of the gain changing circuit is controlled directly in response to the output of a radio altimeter. Instead of controlling the gain changing circuits directly as a function of an altimeter reading, they could be controlled directly as a function of time if the accuracy of the system will permit the assumption to be made that the rate of descent is constant. The gain changing circuit could be simply a potentiometer whose movable contact is driven responsive to the output of the radio altimeter in accordance with the gain schedules shown in FIG. 3, an electronic amplifier whose gain is controllable responsive to an electrical signal or an analog computer comprising a divider, a unity gain amplifier, and a summing circuit. The desired gain schedule could be obtained by conventional wave shaping techniques. Thus, the output of the radio altimeter could be applied to a dead zone amplifier and a peak limiter connected in series. The setting of the peak limiter would determine the high altitude at which the gain schedule flattens out and the setting of the dead zone amplifier would determine the low altitude at which the gain schedule flattens out. The output of the limiter would then be used to control the gain of the gain changing circuit in a linear fashion.

Reference is made to FIG. 1. It is assumed the aircraft has already captured and is flying on the glide slope beam. Thus, a glide slope receiver 1 produces a glide slope error signal proportional to the vertical displacement of the aircraft from the center of the glide slope beam. The glide slope error signal from receiver 1 is applied to a gain changing circuit 2 having a gain schedule A. As illustrated in FIG. 3, circuit 2 transmits 100 percent of the glide slope error signal above an altitude of 500 feet, transmits a percentage of the glide slope error signal that decreases to zero between an altitude of 500 and 50 feet, and transmits zero percent of the glide slope error signal below 50 feet altitude.

The output of gain changing circuit 2 is amplified by an amplifier 3. The output of amplifier 3 is applied directly to one input of a summing junction 4 and is applied to the other input of summing junction 4 through a mode selection switch 5 and an integrator 6. As depicted by the mathematical signs in FIG. 1, the inputs to summing junction 4 are additively combined.

Prior to capture of the glide slope beam by the aircraft, switch 5 is in its lower position to set integrator 6 so its output is synchronized to the actual rate of descent of the aircraft at the time of capture. This provides a smooth transition into the glide slope mode. The nature of the signal applied through switch 5 to integrator 6 prior to capture is described in detail below. After the aircraft has captured the glide slope beam, switch 5 is manually or automatically placed in the upper position as shown in FIG. 1. Integrator 6 serves to eliminate any steady state offsets from beam center while the aircraft is following the glide slope beam. The output of summing junction 4 is applied to a gain changing circuit 7 that has a gain schedule C. As illustrated in FIG. 3, gain changing circuit 7 transmits 100 percent of the signal applied to its input above an altitude of 50 feet, and transmits a percentage of its input that decreases to 10 percent between an altitude of 50 feet and zero feet, i.e., touchdown. Gain changing circuit 7 controls the flare profile of the aircraft as it approaches touchdown. The 10 percent signal transmission through gain changing circuit 7 at the point of touchdown assures that the aircraft will land with its nose pitched slightly down. The output of gain changing circuit 7 is applied to one input of a summing junction 8.

A normal accelerometer 11 produces an output that is representative of the acceleration of the aircraft center of gravity in a direction normal to its longitudinal and lateral axes. The output of normal accelerometer 11 is coupled through a high pass filter 14, which eliminates the effect of drift and long period influences in the output of normal accelerometer 11, and an amplifier 19 to one input of a summing junction 12 and one input of a summing junction 13.

The output of a barometric altimeter 15 represents the altitude of the aircraft based on characteristics of the atmosphere surrounding the aircraft. Although a barometric altimeter is capable of giving an accurate reading at high altitude, it is inaccurate at low altitude because of the ground effect and sudden changes in atmospheric conditions such as wind gusts. The output of altimeter 15 is coupled to the other input of summing junction 13 through a rate circuit 16, which differentiates the output of altimeter 15. As depicted in FIG. 1, the inputs to summing junction 13 are additively combined. The output of summing junction 13 is coupled through a low pass filter 17 to one input of a summing junction 18. The output of rate circuit 16 represents the actual rate of descent of the aircraft. A substantial portion of the noise associated with this signal is eliminated by combining therewith a signal representing its amplified derivative, namely, the output of amplifier 19, and applying the combined signal to low pass filter 17. The gain of amplifier 19 equals the time constant of low pass filter 17. This is a well known technique known as complementary filtering.

A radio altimeter 25 produces an output representative of the altitude of the aircraft as determined by the distance traveled by radio pulses in the course of transmission from the aircraft to the ground and back to the aircraft. The output of radio altimeter 25 is applied to a rate circuit 26, which differentiates it. The output of rate circuit 26 is an accurate representation of the actual rate of descent of the aircraft at low altitude because altimeter 25 unlike altimeter 15 is unaffected by wind gusts and the ground effect. However, at high altitude the accuracy of the output of rate circuit 26 leaves much to be desired as a representation of the rate of descent of the aircraft because altimeter 25 reflects changes in the contour of the terrain above which the aircraft is flying. The output of rate circuit 26 is coupled through an amplitude limiter 27 to the other input of summing junction 12, where it is additively combined with the output of amplifier 19, as depicted by the mathematical signs in FIG. 1. Amplitude limiter 27 serves to suppress or limit large pulses at the output of rate circuit 26 that are attributable to sudden changes in the contour of the terrain. In a typical case, amplitude limiter 27 is set to limit above a signal representative of a rate of descent of 17 feet per second and above a rate of ascent of 0.5 feet per second. The output of summing junction 12 is applied to a low pass filter 28 with the same time constant as low pass filter 17. The output of filter 28 is coupled to the other input of summing junction 18 and to one input of a summing junction 29. By coupling the combined differentiated output of radio altimeter 25 and the amplified output of normal accelerometer 11 through low pass filter 28, the noise associated with the output of radio altimeter 25 is also substantially diminished by complementary filtering.

The outputs of filters 28 and 17 combine differentially at summing junction 18, as depicted by the mathematical signs in FIG. 1. The output of summing junction 18 is coupled through a gain changing circuit 30 with a gain schedule B to the other input of summing junction 29. The output of low pass filter 28 and the output of gain changing circuit 30 combine additively at summing junction 29, as depicted by the mathematical signs in FIG. 1. As illustrated by gain schedule B in FIG. 3, gain changing circuit 30 transmits 100 percent of its input above an altitude of 200 feet, transmits a percentage of its input that decreases to zero between an altitude of 200 and 100 feet, and transmits zero percent below an altitude of 100 feet. Above an altitude of 200 feet, the difference between the outputs of filters 17 and 28 is coupled through gain changing circuit 30 to summing junction 29 where it is added to the output of filter 28. Therefore, the output of summing junction 29 is the same as the output of filter 17, the output of filter 28 being subtracted out by its application both to summing junction 18 and to summing junction 29. Below an altitude of 100 feet, the output of gain changing circuit 30 is zero so the output of summing junction 29 is the same as the output of filter 28. At an altitude between 200 and 100 feet, the output of summing junction 29 is a combination or blend of the outputs of filters 17 and 28. The percentage of the output from filter 28 is inversely related to altitude, i.e., it increases as the aircraft descends and the percentage of the output from filter 17 is directly related to altitude, i.e., it decreases as the aircraft descends. The output of summing junction 29 is applied to another input of summing junction 8.

In summary, at an altitude above 200 feet, where barometric altimeter 15 produces an accurate reading, the output of summing junction 29 represents the actual rate of descent of the aircraft as derived from the information provided by barometric altimeter 15. At an altitude below 100 feet, where the reading from radio altimeter 25 produces an accurate reading, the output of summing junction 29 represents the actual rate of descent of the aircraft as derived from the information provided by radio altimeter 25. At altitudes between 200 and 100 feet, the output of summing junction 29 represents the actual rate of descent of the aircraft as derived from a blend of the information furnished by altimeters 15 and 25. It is to be noted that the particular arrangement of FIG. 1 blends the outputs of the two sources as described above by means of a single gain changing circuit. A straightforward implementation of an arrangement for blending the outputs of two sources in this way would require two gain changing circuits.

The output of radio altimeter 25 is also coupled through a low pass filter 31 to the gain schedule inputs of gain changing circuits 2 and 30. Low pass filter 31 serves to suppress noise and smooth out rapid fluctuations in the response of radio altimeter 25. The output of radio altimeter 25 is also directly applied to the gain schedule input of gain changing circuit 7. No low pass filter is interposed between radio altimeter 25 and gain changing circuit 7 because the close proximity of the aircraft to the ground when gain changing circuit 7 is operative requires a fast response to changes in altitude, and the concomitant close proximity to the airport assures that the terrain is flat.

The output of a vertical gyro 35 is coupled through a high pass filter 36 to one input of a summing junction 37. The output of vertical gyro 35 is representative of the pitch attitude of the aircraft. High pass filter 36 serves to eliminate the effect of drift and long period error. The output of vertical gyro 35 is also coupled through a rate circuit 38 to the other input of summing junction 37 where it is additively combined with the output of high pass filter 36, as depicted by the mathematical signs in FIG. 1. The output of summing junction 37, which serves as a damping signal, is applied to the remaining input of summing junction 8 where it is additively combined with the output of summing junction 29 and the output of gain changing circuit 7, as depicted by the mathematical signs in FIG. 1. The output of summing junction 8 is a command signal that is applied to a utilization device 39. Utilization device 39 could be an actuator that automatically positions the pitch control surface of the aircraft, or a visual aircraft instrument that enables the pilot to control the pitch control surface manually.

The operation of the apparatus of FIG. 1 in the course of a descent is as follows: the output of gain changing circuit 7 continuously provides a signal representative of the desired rate of descent of the aircraft throughout the landing maneuver; the output of summing junction 29 continuously provides a signal representative of the actual rate of descent of the aircraft throughout the landing maneuver; and the output of summing junction 37 provides a damping signal. The output of summing junction 8 continuously provides a signal representative of the deviation between the actual and desired values of rate of descent as anticipated by the damping signal. At an altitude above 500 feet, 100 percent of the glide slope error signal from receiver 1 is coupled by gain changing circuit 2 to the input of summing junction 4 and the input of integrator 6. Thus, the desired rate of descent of the aircraft is completely determined by the glide slope error. At an altitude between 500 and 50 feet, the percentage of the glide slope error signal applied to summing junction 4 and integrator 6 is gradually reduced to zero. In this altitude range, therefore, the influence of the glide slope error signal on the desired rate of descent of the aircraft is gradually reduced to zero and the desired rate of descent is influenced more and more by the history, so to speak, of the descent recorded by integrator 6. At altitudes below 50 feet the output of gain changing circuit 2 is zero, so the output of integrator 6 remains constant at a, so to speak, memorized rate of descent developed as the aircraft descends from an altitude of 500 feet to 50 feet. The output of integrator 6 is linearly reduced to 10 percent of its original value by gain changing circuit 7 as the aircraft descends from an altitude of 50 feet to touchdown. Thus, gain changing circuit 7 defines a desired flare path for the aircraft immediately prior to touchdown. At an altitude above 200 feet, the differentiated barometric altimeter reading at the output of rate circuit 16 is coupled through gain changing circuit 30 to summing junction 29. Therefore, the actual rate of descent of the aircraft is influenced exclusively by the response of barometric altimeter 15. At an altitude between 200 and 100 feet, the output of rate circuit 16 is blended out by gain changing circuit 30, and the differentiated radio altimeter reading at the output of rate circuit 26 is blended in at the input of summing junction 29. Therefore, the actual rate of descent of the aircraft is influenced to an increasing degree by the response of radio altimeter 25 and to a decreasing degree by the response of barometric altimeter 15. At an altitude below 100 feet, the differentiated radio altimeter reading at the output of rate circuit 26 is applied to summing junction 29. Therefore, the actual rate of descent of the aircraft is exclusively influenced by the response of radio altimeter 25.

Prior to engagement of the glide slope mode, switch 5 is in its lower position so the output of summing junction 8 is fed back through an amplifier 40 to the input of integrator 6. During this time, there is no output from glide slope receiver 1. Therefore, the output of integrator 6 is synchronized to the sum of the outputs from summing junctions 29 and 37. When switch 5 is moved to its upper position upon engagement of the glide slope mode, integrator 6 is set so a smooth transition takes place.

The apparatus of FIG. 2 differs from that of FIG. 1 in several respects. First, no barometric altimeter is provided from which an actual rate of descent representative signal for use at high altitude can be derived. Accordingly, such a signal is derived from the output of normal accelerometer 11, which is an approximation of the vertical acceleration of the aircraft. The integral of the vertical acceleration of the aircraft equals the aircraft rate of descent absent its steady state component, i.e., the constant of integration. At altitudes where the glide slope error signal is effective, the integrated output signal of normal accelerometer 11 serves an accurate representation of the actual rate of descent of the aircraft because the glide slope error signal corrects any steady state offset of the aircraft from beam center. Thus, the output of high pass filter 14 is coupled through a gain changing circuit 45 having a gain schedule B and an amplifier 46 to one input of a summing junction 47. The output of amplifier 3 is applied to the other input of summing junction 47 where it is additively combined with the output of amplifier 46, as depicted by the mathematical signs in FIG. 2. The output of summing junction 47 is coupled through switch 5 to integrator 6. The integration necessary for deriving a rate of descent representative signal from normal accelerometer 11 is performed by the pre-existing integrator in the glide slope error signal portion of the apparatus, namely, by integrator 6. Thus, the expense of a separate integrator is spared. After gain changing circuit 2 reduces the glide slope error signal to zero, the reliability of the integrated output signal from accelerometer 11 lessens. Accordingly, gain changing circuit 45 diminishes the influence of the output of accelerometer 11 as the aircraft descends from an altitude of 200 feet to 100 feet and gain changing circuit 30 increases the influence of the differentiated output of radio altimeter 25. Instead of applying an actual rate of descent representative signal accurate at high altitude to summing junction 18, as in FIG. 1, the output of a constant direct current bias source 48 is applied to summing junction 18 in FIG. 2. The magnitude of the bias furnished by source 48 represents some nominal value of the rate of descent of the aircraft that is not critical. The setting of integrator 6 reflects the bias value selected for source 48. In other words, if a bias value representing a larger rate of descent is selected, the output of integrator 6 represents a smaller rate of descent.

The second difference of the apparatus of FIG. 2 is that control of the aircraft in the vertical direction is concurrently exercised by pitch and direct lift control. Pitch control is effected by positioning an elevator and direct lift control is effected by positioning spoilers, which are control surfaces located on the wings of the aircraft. Accordingly, the output of summing junction 29 and the output of gain changing circuit 7 are applied to a summing junction 49 where they are additively combined, as depicted by the mathematical signs in FIG. 2. The outputs of summing junctions 37 and 49 are applied to a summing junction 50 where they are additively combined, as depicted by the mathematical signs in FIG. 2. The output of summing junction 50 is applied to an elevator actuator 51 and through amplifier 40 to switch 5. The output of summing junction 49 is also applied to one input of a summing junction 51. The output of normal accelerometer 11 is coupled through a high pass filter 52 as a damping signal to the other input of summing junction 51 where it is additively combined with the output of summing junction 49, as depicted by the mathematical signs in FIG. 2. The output of summing junction 51 is applied to a spoiler actuator 53.

It is to be noted that in the embodiment of FIG. 2, it is not possible to designate the output of gain changing circuit 7 as representative of the desired vertical velocity of the aircraft at all times during the landing maneuver because of the influence of accelerometer 11 whose output is applied to integrator 6 to derive an actual rate of descent representative signal accurate at high altitude. The overall effect, however, is identical to the overall effect achieved in the embodiment of FIG. 1 because the sum of the signals is the same. In this regard, the difference between the embodiments of FIGS. 1 and 2 is basically a difference in the way the similar signals are combined at various summing junctions. It will become apparent that the invention contemplates various other combinations of signal components which achieve the same results described in connection with the embodiments of FIGS. 1 and 2.

It has been found that the gain schedule that controls the flare profile can be used to blend the integrated output of accelerometer 11 and the differentiated output of altimeter 25, thereby eliminating gain schedule B of FIG. 3. This has two advantages. First, terrain variations, which effect the output of altimeter 25, have less effect on the performance of the system at touchdown because the information from altimeter 25 is not used to indicate actual rate of descent until flare is initiated, i.e., until the aircraft has descended to an altitude of 50 ft. Second, the same gain changing circuit can be used to control the flare profile and to blend the integrated output of accelerometer 11 with the differentiated output of altimeter 25. The use of the same gain schedule to control the flare profile and to blend the outputs from the two rate of descent sensors is particularly advantageous when one of the sensors is the integrated output of a vertical or normal accelerometer because such a sensor remains reliable until the glide slope error signal is eliminated. In contrast, the differentiated output of a barometric altimeter becomes unreliable at a much higher altitude because its sources of unreliability are atmospheric disturbances and the ground effect.

Figure 5:
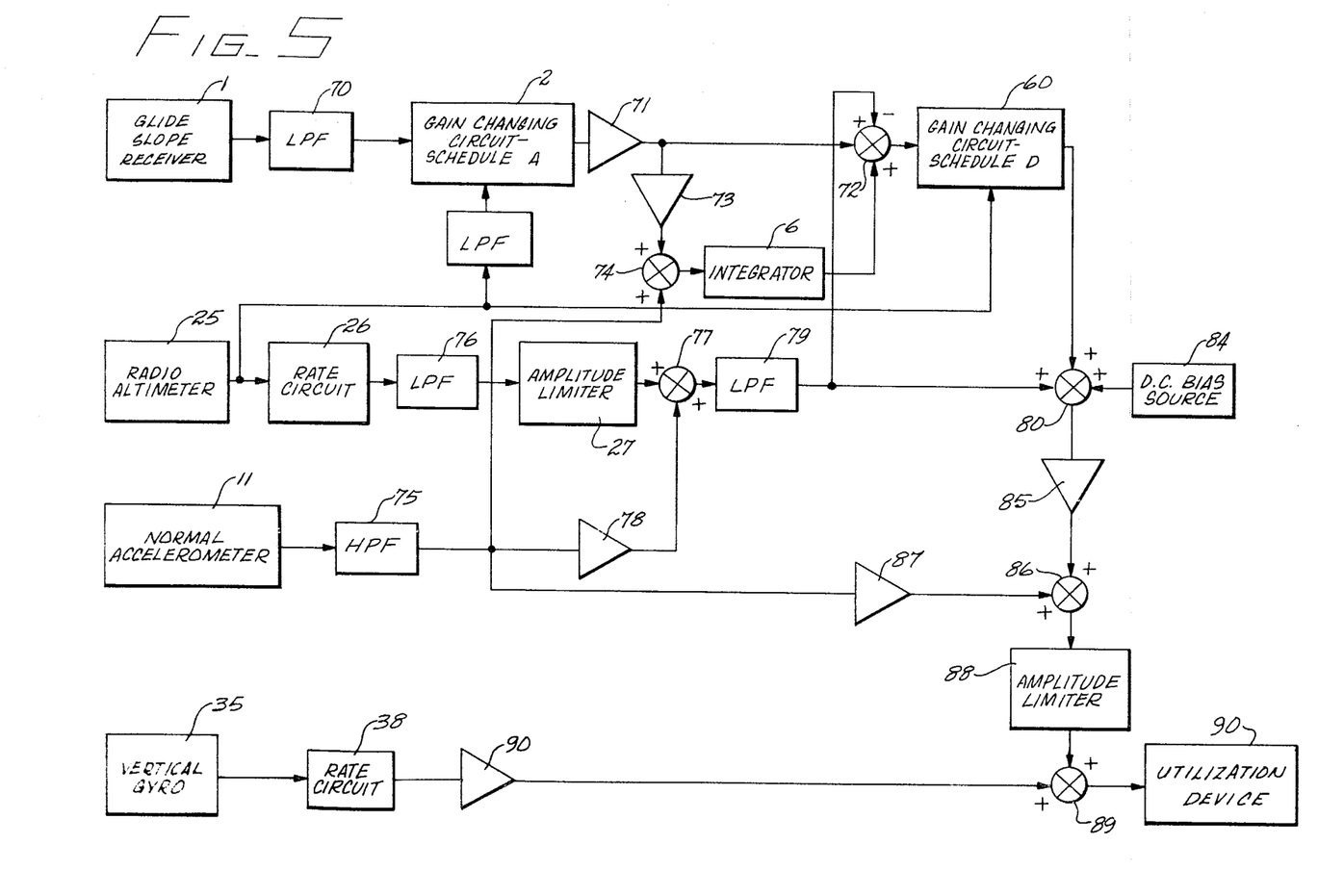
FIG. 5 is a complete block schematic diagram of an arrangement based on the arrangement shown partially in FIG. 4A.

In FIG. 5 there is shown an automatic flight control system that illustrates the use of the same gain schedule to control a flare profile and to blend the outputs of two rate of descent sensors. To facilitate comprehension of FIG. 5, reference is first made to FIG. 4A for a version thereof involving a duplication of components. The common gain schedule, which is introduced by gain changing circuits 60 and 61 in FIG. 4A, is depicted in FIG. 4B as gain schedule D. As illustrated in FIG. 4B, gain changing circuits 60 and 61 transmit 100 percent of the signals applied to their respective inputs above an altitude of 50 feet and transmit a percentage of their respective input signals that decreases from 100 percent to zero between an altitude of 50 feet and ground. In FIG. 4A, the output of glide slope receiver 1 is coupled to gain changing circuit 2. The output of gain changing circuit 2 is directly coupled to one input of a summing junction 62 and is coupled by integrator 6 to the other input of summing junction 62. As depicted in FIG. 4A, the two inputs to summing junction 62 are additively combined. Gain changing circuit 60 connects the output of summing junction 62 to one input of a summing junction 63. Gain changing circuit 60 controls the flare profile during the landing maneuver. Its output represents the desired rate of descent of the aircraft. The output of normal accelerometer 11 is coupled by integrator 64 to one input of a summing junction 65. Gain changing circuit 61 connects the output of summing junction 65 to one input of a summing junction 66. The output of radio altimeter 25 is coupled by rate circuit 26 to the other input of summing junction 65 and to the other input of summing junction 66. As depicted by the mathematical signs in FIG. 4A, the outputs of integrator 64 and rate circuit 26 combine differentially and the outputs of gain changing circuit 61 and rate circuit 26 combine additively. The output of summing junction 66, which represents the actual rate of descent of the aircraft, is connected to the other input of summing junction 63, where it is additively combined with the output of gain changing circuit 60 as depicted by the mathematical signs in FIG. 4A. The output of summing junction 63 represents the deviation between the actual and desired aircraft rate of descent, i.e., rate of descent error. At an altitude above 50 feet, the output of summing junction 66 represents the actual rate of descent of the aircraft as derived from the information provided by accelerometer 11. At an altitude below 50 feet, where gain changing circuit 2 transmits none of the glide slope error signal, the output of summing junction 66 represents the actual rate of descent of the aircraft as derived from a blend of the information furnished by accelerometer 11 and altimeter 25. The influence of altimeter 25 increases with decreasing altitude and the influence of accelerometer 11 decreases with decreasing altitude.

As is well known in the art, a radio altimeter is considered to be highly accurate at heights near ground level while accelerometer provided signals are preferable at higher altitudes. The reason is that an accelerometer is generally unaffected by terrain changes and is thus favored at high altitudes whereas radio altimeters are favored for low level due to sensitivity to terrain changes.

It can be seen from an inspection of FIG. 4A that integrator 64 and gain changing circuit 61 can be eliminated by applying the output of accelerometer 11 to the input of integrator 6, differentially combining the output of rate circuit 26 with the outputs of integrator 6 and gain changing circuit 2, and additively combining the output of rate circuit 26 with the output of gain changing circuit 60. These modifications, which are in essence implemented in the embodiment of FIG. 5, enable two functions to be carried out by a single integrator and a single gain changing circuit. Thus, integrator 6 integrates the output of accelerometer 11 and the output of gain changing circuit 2, while gain changing circuit 60 reduces the gain of the output of summing junction 62 and the output of summing junction 65.

The major components of FIGS. 1, 2 and 4A are duplicated in FIG. 5. These duplicated major components, i.e., all the components except summing junctions, filters and amplifiers, bear the same reference numerals used in FIGS. 1, 2 and 4A. In FIG. 5, the output of glide slope receiver 1 is coupled by a low pass filter 70 to gain changing circuit 2. The output of gain changing circuit 2 is coupled by an amplifier 71 to one input of a summing junction 72. The output of amplifier 71 is coupled by an amplifier 73 to one input of a summing junction 74. The output of accelerometer 11 is coupled by a high pass filter 75 to the other input of summing junction 74, where it is additively combined with the output of amplifier 73, as depicted by the mathematical signs in FIG. 5. The output of summing junction 74 is coupled by integrator 6 to another input of summing junction 72. The output of altimeter 25 is coupled by rate circuit 26, a low pass filter 76, and amplitude limiter 27 to one input of a summing junction 77. The output of high pass filter 75 is coupled by an amplifier 78 to the other input of summing junction 77, where it is additively combined with the output of amplitude limiter 27 as depicted by the mathematical signs. The output of summing junction 77 is coupled by a low pass filter 79 to the remaining input of summing junction 72 and to one input of a summing junction 80. The output of low pass filter 79 is differentially combined with the outputs of amplifier 71 and integrator 6 at summing junction 72, as depicted by the mathematical signs. The output of summing junction 72 is connected by gain changing circuit 60 to another input of summing junction 80. The output of a direct current bias source 84 is coupled to the remaining input of summing junction 80, where it is additively combined with the outputs of low pass filter 79 and gain changing circuit 60 as depicted by the mathematical signs. Source 84 provides a bias to insure that the aircraft is nose down at touchdown. The output of summing junction 80 is coupled by an amplifier 85 to one input of a summing junction 86. The output of a high pass filter 75 is coupled by an amplifier 87 to the other input of summing junction 86, where it is additively combined with the output of amplifier 85. The output of summing junction 86 is coupled by an amplitude limiter 88 to one input of a summing junction 89. The output of vertical gyro 35 is coupled by rate circuit 38 and an amplifier 90 to the other input of summing junction 89 where it is additively combined with the output of limiter 88, as depicted by the mathematical signs. A utilization device 90 is driven by the output of summing junction 89 where the command signal appears.

Figure 6:
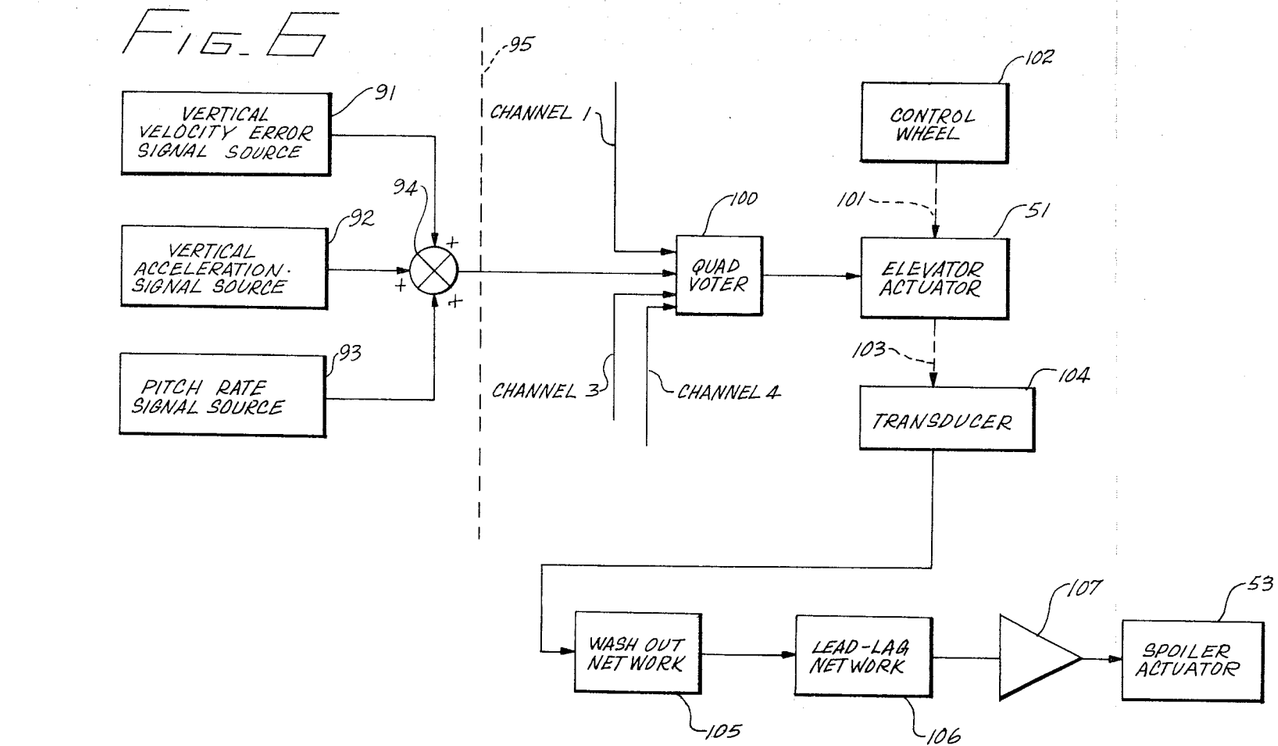
FIG. 6 is a block schematic diagram of the arrangement for coupling the command signal generated in FIG. 5 to elevator and spoiler actuators.

FIG. 6 shows an arrangement for coupling to elevator actuator 51 and spoiler actuator 53 the command signal generated by the arrangement of FIG. 5. In FIG. 6, a vertical velocity error signal source 91 represents the output of amplifier 85 in FIG. 5, a vertical acceleration signal source 92 represents the output of amplifier 87 in FIG. 5, and a pitch rate signal source 93 represents the output of amplifier 90 in FIG. 5. The outputs of sources 91, 92 and 93 are connected to the inputs of a summing junction 94, where they are additively combined as depicted by the mathematical signs in FIG. 6. Summing junction 94 represents summing junctions 86 and 89 in FIG. 5; amplitude limiter 88 is not represented in FIG. 6. Utilization device 90 in FIG. 5 represents the components of FIG. 6 located to the right of a dashed line 95.

It is assumed that the arrangement of FIG. 6 is part of a four channel redundant fail operational automatic flight control system. Thus, the output of summing junction 94, where a special command signal appears, is applied to one input of a quad-voter 100. Any quad voter known in the prior art may be used. An exemplary quad voter is disclosed in U.S. Pat. No. 3,639,778 which is owned by the assignee of the subject application. Similar command signals from the remaining three channels are applied to the other inputs of quad voter 100. Quad voter 100 is a conventional circuit that selectively transmits to its output the signal applied to one of its inputs, depending upon the relative amplitudes of the input signals. Thus, quad voter 100 selects the best of the command signals to drive elevator actuator 51. The output of quad voter 100 is connected to the input of elevator actuator 51. A mechanical linkage designated by a dashed line 101 couples a pilot operated aircraft control wheel 102 to elevator actuator 51. Thus, when the aircraft is operating in a manual mode, elevator actuator 51 is driven responsive to pilot input commands from control wheel 102. As represented by a dashed line 103, a position transducer 104 is mechanically coupled to a moving part of elevator actuator 51, such as its drive piston. Accordingly, transducer 104 produces an electrical signal representative of the movement of elevator actuator 51 and also the special command signal that drives actuator 51. The output of transducer 104 is coupled through a washout network 105, a lead-lag network 106, and an amplifier 107, to the input of spoiler actuator 53. Washout network 105 and lead-lag network 106, in essence, shape the special command signal to make it appropriate as the spoiler command signal.

Prior art techniques would dictate the use of separate command signals for elevator actuator 51 and spoiler actuator 53, because different damping terms are conventionally used in the pitch control loop and in the direct lift control loop. In a redundant fail operational control system, separate command signals for each channel require separate quad voters to select the best of each of these command signals. In contrast, the invention utilizes a single special command signal for each channel that is appropriate for both elevator actuator 51 and spoiler actuator 53. This special command signal is coupled through a single quad voter, namely, quad voter 100, to elevator actuator 51 and the signal to drive spoiler actuator 53 is derived from elevator actuator 51. Thus, the need for separate quad voters is obviated.

A conventional elevator command signal comprises a term reprsenting the vertical velocity error, a damping term representing the pitch rate, and a damping term representing lagged pitch rate, i.e., the output of a vertical gyro that is washed out by passage through a high pass filter, as shown in FIGS. 1 and 2. A conventional direct lift command signal comprises a term representing vertical velocity error and a damping term representing vertical acceleration. The generation of the special command signal in FIG. 6 is based upon the recognition that a term representative of vertical acceleration approximates a term representative of a lagged pitch rate insofar as the pitch control loop is concerned. This can be seen qualitatively by considering the dynamics of flight: if a change in pitch attitude is introduced, the aircraft will respond thereto after a short delay by vertically accelerating or decelerating.

In short, the output of vertical acceleration signal source 92 provides a common damping term for the special command signal of FIG. 6 for the pitch and direct lift control loops. This damping term approximates a lagged pitch rate term, thereby making the special command signal suitable for elevator actuator 51, and indicates the reaction to wind gusts and other atmospheric disturbances as well as the spoiler activity, thereby making the special command signals suitable for spoiler actuator 53. Transducer 104 in effect recovers the special command signal from elevator actuator 51 for use to drive spoiler actuator 53. In other words, the output of transducer 104 is substantially identical to the output of quad voter 100. However, by reconstructing the spoiler command signal from the movements of elevator actuator 51, this command signal also reflects input commands from control wheel 102 when the aircraft is operating in a manual mode. Washout network 105 serves to eliminate the steady state component, i.e., the trim component, from the special command signal and lead-lag network 106 serves to stabilize the direct lift control loop against the adverse effects of the pitch rate term of the special command signal which is contributed by source 93. Depending upon the characteristics of the system with which the arrangement of FIG. 6 is used, other types of shaping networks might be employed to modify the constructed elevator command signal. It can be seen that another advantageous feature of the arrangement of FIG. 6 is that the spoiler command signal bears the same relationship to the movements of elevator actuator 51 in a manual mode and in an automatic flight mode. Consequently, the aircraft responds uniformly to control wheel input commands and to electrically computed input commands.

Although the arrangement of FIG. 6 is particularly suited for use with the arrangement of FIG. 5, it has general applicability to flight control systems with a vertical velocity error signal source, a vertical acceleration signal source, and a pitch rate signal source. For this reason, sources 91, 92 and 93 are represented as blocks in FIG. 6.

The described embodiments of the invention are only considered to be preferred and illustrative of the inventive concepts; the scope of the invention is not to be restricted to such embodiments. There are numerous other arrangements which may be devised by one skilled in the art without departing from the spirit and scope of this invention. For example, although the invention is described in connection with a landing maneuver, it will be clear to one skilled in the art that a number of its principles are applicable to ascent maneuvers as well as descent maneuvers.

What is claimed is:

1. Apparatus for generating an aircraft flight control signal that is representative of the actual rate of altitude change of an aircraft at all altitudes during descent or ascent, the apparatus comprising:

a first source of first signals that is an accurate representation of the rate of altitude change of the aircraft at high altitude and an unreliable representation of the rate of altitude change of the aircraft at low altitude;

a second source of second signals that is an unreliable representation of the rate of altitude change of the aircraft at high altitude and an accurate representation of the rate of altitude change of the aircraft at low altitude, said second source comprising a radio altimeter and means for differentiating the output of said radio altimeter; and generating means for generating a flight control signal from said first signals at altitudes higher than a selected altitude, and with a combination of said first and second signals at altitudes lower than said selected altitude, the percentage of said first signals being decreased and the percentage of said second signal being increased in response to descent of said aircraft at altitudes below said selected altitude, said generating means comprising first means for combining said first and second signals in a first sense; means for transmitting a constant maximum percentage of the amplitude of the combined signals at altitudes above said selected altitude, and below said selected altitude a decreasing percentage of the combined signals in response to descent towards zero altitude; and second means for combining the transmitted signal and the second signal in a second sense that is opposite said first sense.

2. Apparatus for generating an aircraft flight control signal to control an aircraft in the vertical direction during descent, the apparatus comprising:

a first source of signals representing a desired rate of descent, said first source comprising means for producing a signal representing a glide slope error signal of the aircraft from the center of the beam, means for reducing the gain of the glide slope error signal from a constant value at high altitude to zero at a given low altitude, means for dividing the reduced glide slope error signal into a first portion and a second portion, means for integrating the first portion, and means for combining the integrated first portion and the second portion to produce the signal from the first source;

a second source of signals representing the actual rate of descent of the aircraft, the signal from the second source being accurate at high altitude and unreliable at low altitude, said second source comprising a sensor of vertical acceleration of the aircraft and means for integrating the output of the sensor;

a third source of signals representing the actual rate of descent of the aircraft, the signal from the third source being unreliable at high altitude and accurate at low altitude;

and means for generating a control signal representative of the difference between the signal from the first source and a blend of signals from the second and third sources, the control signal comprising a reduction of the gain of the signal from the second source from full gain at and above the given low altitude towards zero gain at ground level and an increase in the gain of blended signals from zero gain at the given low altitude towards full gain at ground level, said blended signals including a combination of signals from said second and third sources.

3. The apparatus of claim 2, in which:

the means for integrating the first portion of the glide slope error signal comprises an integrator having an input and means for applying the first portion to the input of the integrator; and the means for integrating the output of the sensor comprises means for connecting the output of the sensor to the input of the integrator.

4. The apparatus of claim 3, in which said means for generating a control signal includes:

a gain changing circuit having an input and an output;

means for applying the glide slope error signal to the input of the gain changing circuit;

means for applying said signals from said second source to the input of said gain changing circuit; and means for applying the blended signals to the input of the gain changing circuit in one sense and means for applying the blended signals to the output of the gain changing circuit in the opposite sense, whereby said blended signals are cancelled from said control signal at altitudes equal to or higher than said given low altitude.

5. The apparatus of claim 4, in which the third source is a radio altimeter and a rate circuit responsive to the output of the radio altimeter.

6. An automatic flight control system for an aircraft comprising:

a plurality of nominally identical channels, each channel producing a pitch command signal;

a signal voter that selectively transmits to its output the signal applied to one of its inputs, depending upon the relative amplitude of the input signals;

means for coupling the command signals produced by the plurality of channels to the respective inputs of the signal voter;

pitch control means for effecting pitch control of said aircraft;

means for coupling the output of the signal voter to the input of said pitch control means to operate said pitch control means responsive to the selectively transmitted command signal; and direct lift control means for effecting lift control of said aircraft concurrently with and in response to operation of said first control means in accordance with said command signals.

7. The flight control system of claim 6 wherein said direct lift control means comprises:

a transducer that is mechanically coupled to the pitch control means to produce an electrical signal representative of the movements of the pitch control means; and means for coupling said electrical signal produced by the transducer to the input of the direct lift control means.

8. The flight control system of claim 7, in which the means for coupling the electrical signal produced by the transducer to the input of the direct lift control means comprises a network for shaping the signal produced by the transducer.

9. The flight control system of claim 8, in which a pilot operated input device is mechanically coupled to the pitch control means to introduce input commands from the pilot.

10. The flight control system of claim 9, in which each channel comprises a first source of signals representative of vertical velocity error of the aircraft, a second source of signals representative of vertical acceleration of the aircraft, and a third source of signals representative of pitch rate of the aircraft, and the command signal is generated by additively combining the outputs of the first, second and third sources.

11. The flight control system of claim 7, in which a pilot operated input device is mechanically coupled to the pitch control means to introduce input commands from the pilot.

12. The flight control system of claim 6, in which each channel comprises a first source of signals representative of vertical velocity error of the aircraft, a second source of signals representative of the vertical acceleration of the aircraft, and a third source of signals representative of the pitch rate of the aircraft, and the command signal is generated by additively combining the outputs of the first, second, and third sources.

13. A flight control system for an aircraft comprising:
a first source of signals representative of the vertical velocity error of the aircraft from a desired value;
a second source of signals representative of the vertical acceleration of the aircraft;
a third source of signals representative of the pitch rate of the aircraft;
means for combining the outputs of the first, second and third sources to produce a pitch command signal;
aircraft pitch control means responsive to the pitch command signal;
means for monitoring the operation of said aircraft pitch control means to generate direct lift command signals representative of the operation of the pitch control means; and
aircraft direct lift control means, responsive to the direct lift command signal, for altering lift in accordance with operation of said pitch control means.

14. The flight control system of claim 13, in which a shaping network is provided and the direct lift command signal is coupled by the shaping network to the input of the direct lift control means.

15. A control system for controlling the flight of an aircraft in a vertical direction during descent or ascent, by providing control signals, the control system comprising:
a first source of signals representing a desired rate of change of altitude, said first source comprising a glide slope receiver that produces an error signal representative of the vertical displacement of the aircraft from a glide slope path; means for dividing the error signal of the glide slope receiver into first and second portions; an integrator to which the first portion of said error signal is applied; means for combining the output of the integrator and the second portion of said error signal to form the signal from the first source; and a first gain changing circuit for reducing the gain of said error signals from a full gain at a first selected high altitude to zero gain at a second selected lower altitude;
a second source of signals representing an actual rate of change of altitude of the aircraft, said second source including a sensor of vertical acceleration;
a third source of signals including a radio altimeter for providing signals representing a derived rate of change of altitude of the aircraft;
a second gain changing circuit for reducing the gain of signals applied as inputs thereto, from a full gain at said second selected lower altitude towards a zero gain at ground level, said second gain changing circuit receiving as inputs thereto the combined output of the integrator and the second portion of said error signal, said integrator receiving signals from said second source as an input thereto;
blending means for producing a blended rate of change of altitude signal by combining the signals from said second and third sources, said blending means including means for combining said blended rate of change of altitude signal, in opposite senses, with the input signals and the output signals of said second gain changing circuit to have said blended signal effectively cancelled and of no effect at altitudes higher than said second selected lower altitude, and the effect of said blended signal change towards becoming exclusive at ground level.

16. The control system defined by claim 15, in which the third source comprises a radio altimeter and a rate circuit responsive to the output of the radio altimeter, and the gain changing circuits are responsive to the output of the radio altimeter.

17. The control system defined by claim 15, in which the output of the second gain changing circuit is reduced to precisely zero at ground level and a source of direct current bias is combined with the output of the second gain changing circuit to produce a selected minimum rate of descent for an aircraft to be controlled by said system.

18. An aircraft control system for generating a command signal that may be used to control the pitch of an aircraft by having the command signal applied to operate the elevators of an aircraft, the control system comprising:
first means for providing an inertially derived vertical velocity signal, said first means including an accelerometer for sensing the acceleration of said aircraft along a vertical axis:
second means for providing a radio derived vertical velocity signal, said second means including a radio altimeter;
gain control means for changing as a function of height the gain of signals applied therethrough, the gain of output signals of said gain control means being reduced from full gain at a preselected height towards zero gain at ground level in accordance with changes in height between said preselected height and ground level;
means for applying said velocity signals from said first and second means as inputs to said gain control means, said signals from said second means being applied in a first sense; and
means for combining, in a sense opposite said first sense, said velocity signal from said second means with the output signals of said gain control means to form said command signals whereby the velocity signals from said second means are effectively cancelled at heights equal to or exceeding said preselected height, and said velocity signals from said second source increasingly replace said velocity signals from said first source in accordance with the changes in gain of said gain control means, said velocity signals from said second source fully replacing said velocity signals from said first source at ground level.

19. The control system defined by claim 18, said second means including a complementary filter for blending signals from said radio altimeter and said accelerometer to provide said radio derived vertical velocity signals.

20. The control system defined by claim 19, said first means including an integrator for integrating said signals from said first means to provide said inertially derived vertical velocity signals.

21. The control system defined by claim 20 further including:
third means for providing signals representative of the vertical acceleration of said aircraft;
fourth means for providing signals representative of the pitch rate of said aircraft;
pitch control means for controlling the pitch of said aircraft in response to said signals from said third and fourth means and said command signals;
means for monitoring the operation of said pitch control means to generate direct lift command signals representative of the operation of said pitch control means; and
direct lift control means for altering lift in response to operation of said pitch control means.

22. The control system defined by claim 21 wherein said pitch control means includes the elevators of said aircraft and said direct lift control means includes the spoilers of said aircraft.

23. The control system defined by claim 22, further including means for providing a glide slope error signal which is selectively applied to said gain control means in accordance with the altitude of said aircraft.

* * * * *